United States Patent [19]

White

[11] 3,997,954
[45] Dec. 21, 1976

[54] LOW FRICTION BEARING PREPARED BY WINDING ONTO A MANDREL

[76] Inventor: Charles S. White, 35815 42nd St., East, Palmdale, Calif. 93550

[22] Filed: Oct. 14, 1975

[21] Appl. No.: 622,005

Related U.S. Application Data

[63] Continuation-in-part of Ser. No. 511,171, Oct. 2, 1974, and Ser. No. 458,559, April 8, 1974, said Ser. No. 511,171, is a continuation-in-part of Ser. No. 458,860, April 4, 1974, Pat. No. 3,874,050, which is a continuation of Ser. No. 334,192, Feb. 20, 1973, and a continuation-in-part of Ser. No. 316,844, Dec. 20, 1972, Pat. No. 3,891,488, which is a continuation-in-part of Ser. No. 76,110, Sept. 28, 1970, abandoned, said Ser. No. 458,559, is a continuation-in-part of Ser. No. 321,566, Jan. 8, 1973, and said Ser. No. 76,110.

[52] U.S. Cl. .................. 29/149.5 B; 29/149.5 NM; 156/170; 308/238; 308/DIG. 8
[51] Int. Cl.² ......................................... B21D 53/10
[58] Field of Search .......... 308/237 R, 238, DIG. 7, 308/DIG. 8; 29/149.5 B, 149.5 NM; 156/170, 172, 169, 173; 428/229; 264/137, 310

[56] References Cited
UNITED STATES PATENTS

| | | | |
|---|---|---|---|
| 3,379,591 | 4/1968 | Bradley | 264/310 X |
| 3,843,759 | 10/1974 | Keeham | 264/137 X |
| 3,891,488 | 6/1925 | White | 308/238 X |

Primary Examiner—M. H. Wood, Jr.
Assistant Examiner—Gene A. Church
Attorney, Agent, or Firm—Burton, Parker & Schramm

[57] ABSTRACT

In a method of preparing a low friction bearing having an inner bearing member, a housing and a low friction surface element therebetween, wherein the housing having an inner surface is constructed to surround the bearing member and said housing is comprised of a plurality of sections which cooperatively define the shape of the outer surface of the inner bearing element, the improvement comprising the steps:

1. winding onto a mandrel a continuous strand of a bondable low friction thread comprised of low friction filaments and bondable filaments impregnated with a bondable resin which is in a solidified yet thermoplastic state;
2. affixing the wound thread to the inner surface of at least one housing section;
3. curing the resin to coalesce the threads and intergrate the turns of the threads to produce a low friction element; and
4. then assembling the bearing by constructing the housing sections about the inner bearing element, at least one of the housing sections having the cured low friction element on the inner surface thereof.

12 Claims, 3 Drawing Figures

LOW FRICTION BEARING PREPARED BY WINDING ONTO A MANDREL

CROSS-REFERENCE TO RELATED APPLICATIONS

The present application is a continuation-in-part of U.S. Ser. No. 511,171 filed Oct. 2, 1974 and Ser. No. 458,559 filed Apr. 8, 1974. Said Ser. No. 511,171 is a continuation-in-part of Ser. No. 458,860, filed Apr. 4, 1974, now U.S. Pat. No. 3,874,050, which is a continuation of Ser. No. 334,192, filed Feb. 20, 1973 and also a continuation-in-part of Ser. No. 316,844, filed Dec. 20, 1972, now U.S. Pat. No. 3,891,488, which is a continuation-in-part of Ser. No. 76,110, filed Sept. 28, 1970, now abandoned. Said Ser. No. 458,559 is a continuation-in-part of said Ser. No. 321,566, Jan. 8, 1973 and said Ser. No. 76,110. All of said applications are hereby incorporated by reference.

FIELD OF INVENTION

This invention relates to low friction bearings, such as ball joints of the ball and socket type and rod end bearings.

BACKGROUND OF THE INVENTION

In prior U.S. Pat. Nos., Re 24,765, 3,037,893 and 3,094,376, I disclose the use of low friction Teflon (trademark for polytetrafluoroethylene) filaments woven with bondable filaments into a cloth which was then adhered to a structural bearing element to provide a low friction surface thereon. Bonding of Teflon is difficult and the use of a cloth containing Teflon filaments and bondable filaments overcame this difficulty. Drawbacks in the use of such cloth include the expense of cutting and shaping it to the surface of a structural bearing element, particularly spherical curved surfaces; difficulty in impregnating the cloth with the bonding resin; uncertainty as to the complete cure of the resin; difficulty of obtaining any mechanical interlock between the cloth fibers and the surface of the structural bearing element other than that provided by the resin itself. As a consequence there was a need for a new approach to applying low friction filaments to structural bearing members which revealed a better low friction bearing and which will lend itself to high production bearing manufacture.

Anti-friction bearings are also described in U.S. Pat. No. 2,958,297.

SUMMARY OF THE INVENTION

The present case is concerned primarily with the production of a low friction bearing by mounting a plurality of housing sections around the outer surface of a bearing element by bonding a plurality of housing sections around the bearing element, the housing sections cooperatively define the outer bearing surface of the inner bearing element. Preferably, a pair of housing sections is provided by the winding of bondable low friction threads in continuous turns around a mandrel having a shape similar to the outer surface of the bearing and then molding the wound mandrel into the interior of each housing section by the application of heat and pressure thereby affixing or bonding the low friction thread to the interior of the housing. The housing then has the thread coalesced and integrated to form the low friction liner.

DESCRIPTION OF PREFERRED EMBODIMENTS

Figure 1:
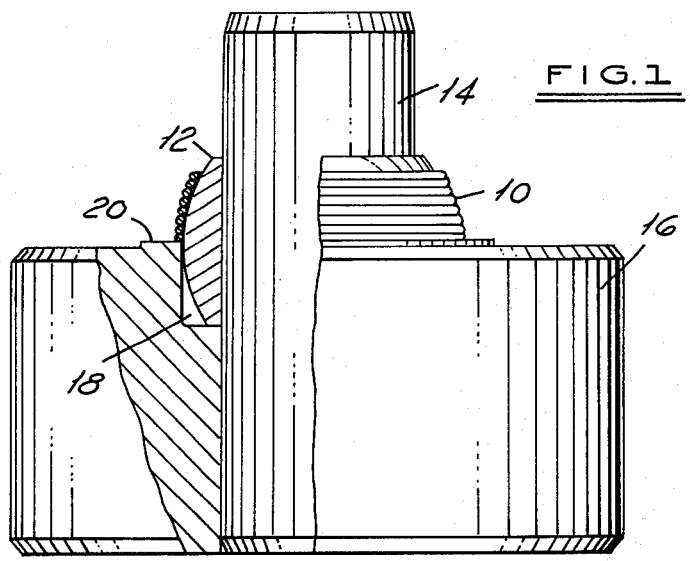
FIG. 1 shows a sleeve with a circular mandrel thereon having the bondable low friction thread wound thereon.

The present case is concerned with a method of preparing a low friction bearing comprising the steps of:

1. winding a bondable low friction thread, impregnated with a resin in a solidified yet thermoplastic state, onto a mandrel; preferably the mandrel has the shape of the outer surface of the inner bearing member;
2. affixing the wound thread to the inner surface of at least one housing section; the housing being comprised of multiple sections;
3. curing the resin to coalesce the threads and integrate the turns of the threads to produce a low friction element; and
4. then assembling the bearing by constructing the housing sections about the inner bearing element, at least one of the housing sections having a cured low friction element.

This therefore provides for rotation of the inner bearing element within the housing, the inner surfaces of the housing sections when joined, cooperatively define the shape of the outer surface of the inner bearing element.

The bondable low friction thread is wound onto a mandrel of a desired shape (FIG. 1) and then subjecting the wound mandrel to heat and pressure to coalesce or integrate the thread turns.

The distinct advantage of the present process is the ability to obtain the bearing in but a few steps. It has been found that the winding may take place on a mold mandrel which may be directly used to mold the thread windings into the raceway or housing, thereby effecting a fully cured condition by the application of heat and pressure. The raceway or housing then has the low friction liner molded onto the inner surface thereof. The next step is the assembly of the housing sections with at least one lined with the cured low friction surface, about the inner bearing element.

By "bondable low friction thread" is meant one comprised of low friction filaments and bondable filaments.

By "bondable" is meant that the thread has the ability to be bonded. An example of this is the formation of a low friction element. The thread is bondable because it is wound onto a mandrel and the turns thereof can be cured and integrated by binding to each other, yet the element is also bondable for they can be cured and bonded to an appropriate housing or structure.

The low friction filaments may be fluorinated hydrocarbons such as fluorinated ethylene derivatives, such as, polytetrafluoroethylene (Teflon type materials), or any other filament which has the desirable low friction properties, such as polytetrafluoropropylene, polychlorotrifluoroethylene, polyvinylidene fluoride, and the like. Most preferably, the low friction filament is a filament comprised of polytetrafluoroethylene. The bondable fibers which generally are employed with the low friction fibers in order to make up the desired low friction thread are of such materials as polyester as Dacron (trademark for DuPont polyester fiber), cotton, acrylic or the like. Lengths of bundles of filaments of Teflon, or the like low frictional material, are formed into a twisted thread or as a braided thread, or with a wire provided in the center of either of the threads. A composite thread may be formed using lengths of bundles of Teflon fibers, twisted or braided with lengths of bundles of bondable filaments or fibers such as Dacron, cotton, nylon, acrylic, graphite, such as Thornel (trademark of Union Carbide for graphite fiber) or the like, so that the resulting thread can be adhered to by the bondable filaments or fibers. A preferred composite thread is made up of Dacron and fiber B.

In general, the thread, prior to being wound onto a bearing or mandrel, is coated or impregnated with a bonding resin by passing the thread through a tank and immersing the thread in the desired resin. The resin, after impregnating the thread, should be cured to the B-stage. By "B-stage" is meant that substantially all of the solvent for the resin has been driven off by the application of heat. For a description of the process of impregnating the low friction thread, see Ser. No. 317,111, filed on Dec. 21, 1972 entitled *Impregnated Bondable Thread and Method* which is hereby incorporated by reference.

The resin that may be employed for impregnating the low friction thread may be any one which will bond the threads to the bearing housing or race, as well as bond the threads to each other. Preferably, the resin may be urea-formaldehyde, phenolformaldehyde, urethane, malamine-formaldehyde and the like.

A thermoplastic resin may also be employed providing the temperature that the resin has a tendency to flow is substantially higher than the operating temperature of the resulting low friction bearing of the present invention.

If the bearing is to be subjected to high temperature, it may be desirable to employ an appropriate high temperature resin. Such resins are discussed in *Machine Design*, 5/15/69 issue, Pages 174–178 which is incorporated by reference. Such resins or adhesives are epoxies, epoxy phenolic, amide-imides, polyimides, polybenzimidazole, polycarboranesiloxane and the like. A preferred high temperature resin is Pyralin (trademark of DuPont for a polyamide).

The low friction thread is impregnated with the bonding resin by passing the thread through the bonding resin which is an aqueous solution, preferably about 50 percent solids and then cured to the B-stage. In other words, the resin that is impregnated in the yarn is preferably in a solidified yet thermoplastic state with a substantial amount of the solvent removed. The yarn is then wound on spools, ready for subsequent processing in accordance with the present invention.

While the resins hereinabove contemplated are generally of the thermosetting resin type, it is in the purview of the invention to use a thermoplastic resin whose softening temperature is above the expected operating temperature of the bearing. In the case of this class of resins, if impregnation of the thread is carried out with the thermoplastic in the solvent solution, the solvent should be removed before the thread is wound onto spools for subsequent use.

The resin, whether a thermoset or thermoplastic resin, that is utilized in the present invention may be characterized as being in a solidified yet "thermoplastic" state (having the property of softening or fusing when heated and of hardening again when cooled) on the thread following impregnation. This is intended to characterize a thermosetting resin which has been cured to the B-stage, as well as a true thermoplastic resin which may be softened by heating. In each instance, the resin will soften and coalesce to form a continuous matrix about and through the bondable low friction thread wound onto the desired shape. In the case of a thermosetting resin, heat and pressure required to mold to C-stage of thread will cause the resin on the thread turns to first soften and coalesce into a continuous matrix, and as the polymerization proceeds, the resin assumes its normal solidified cross-linked character. In the case of a thermoplastic resin, the heat and pressure used to mold the thread turns will simply effect a softening coalescence of thread to a continuous matrix upon which cooling will solidify and effect the bonding of the thread turns to each other.

It is to be understood that the disclosure concerning the coating for the thread, sizing of the thread, and the like, including curing, is really suggestive of the process for resin coating the thread. The important criterion is that the thread be thoroughly and uniformly coated, sized and shaped and cured, in the case of a thermosetting resin to the B-stage, before it is wound onto the desired mandrel.

FIG. 1 is a cross-section, partially broken away of the bondable low friction thread 10 wound onto a mandrel 12 which has an exterior shape similar to that of the desired inner bearing element. The mandrel has inserted within its bore a sleeve 14 which fits within a mold cylinder housing 16. The housing has a cavity 18 in which the mandrel 12 sits. The housing has a lip 20 against which the mandrel rests so that the windings of the bondable low friction thread will be in the form of a series of circles covering an area about one-half of the desired final bearing surface.

Figure 2:
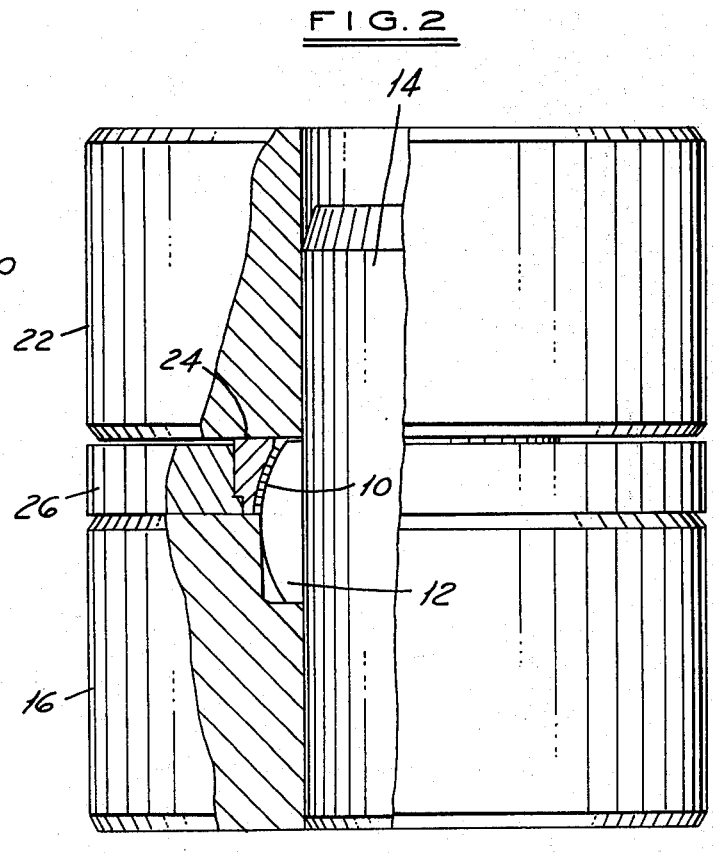
FIG. 2 is a cross-sectional view of the wound mandrel being cured in the interior of the bearing race or housing.

The wound mandrel 12 and sleeve 14 are then inserted into the top position of mold 22 of FIG. 2. The housing section 24 is first held into position by an annular member 26 which fits snugly between the mold cylinder positions. At this stage, heat and pressure are applied in the mold in order to cure the resin and integrate the thread turns thereby bonding the thread into the interior of the housing section. The housing section thereby has the low friction liner bound thereto.

Figure 3:
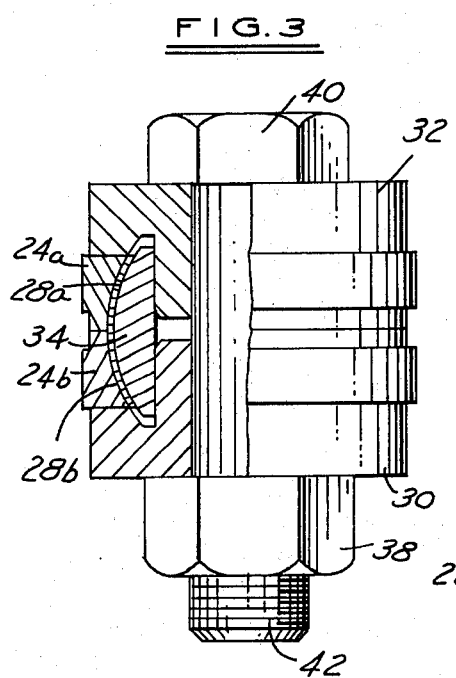
FIG. 3 is a sectional view of the bearing of the present invention, with housing thereon after final assembly.

FIG. 3 shows the final assembly of the bearing. A pair of race members 24a and 24b with their respective formed low friction elements secured thereto 28a and 28b, respectively, are held in position by platen members 30 and 32. The inner bearing element 34 is likewise held in position between the race with low friction liner. The housing sections, prior to the insertion of the low friction liner thereto, may be pretreated by roughening or knurling the interior thereof and by applying an adhesive thereto. In order to facilitate the removal of the windings of low friction thread from the mandrel 12, it is preferably chrome plated and polished. Therefore, when the mandrel has the low friction thread thereon and is placed into the mold cylinder, the thread has a far greater tendency to adhere to the inner surface of the housing section than it does to the mandrel. The thread surface is therefore smooth and continuous having low friction characteristics throughout the formed low friction liner.

The race members 24a and 24b are secured preferably as a result of electron beam welding. The entire spherical bearing assembly is held together during the welding by a nut 38 and bolt 40 with its extended portion 42.

Welding is the preferred means of joining housing sections 24a and 24b because the housing is generally metallic in nature. Electron beam welding is a preferred welding technique because it permits a very controlled welding and unification of the housing unit.

While the above specification teaches one how to prepare low friction bearings, it is to be appreciated that variations in the manufacture can be made without departing from the scope of the invention. For example, it has been determined that the percent resin pickup on the low friction thread treated to the B-stage is about 34 percent by weight (for a typical phenolic resin) while that remaining on the thread after final assembly and cure is about 20–30 percent by weight. These percentages can be varied depending on the end use for the bearing and the resin employed. Also it may be desirable to remove any sizing on the threads before applying any resin thereon. The sizing may alter the application of resin as well as the cure of the resin in and on the yarn.

Also it can be appreciated that due to the ease of handling of the components of the bearing, a highly efficient substantially automatic production assembly can be designated. For example, the assembly of the bearings can be performed on a traveling carousel.

It can also be appreciated that the mandrel used for winding the bondable low friction thread thereon can be designed for repeated usage as part of the mold cylinder.

While FIG. 1 shows only one layer of low friction thread on the mandrel, it can be appreciated that multiple layers may be utilized depending on the end use of the bearing. Relatively thin layers permit the ready dissipation of heat which may be generated during operation of the bearings of the present invention.

What is claimed is:

1. In a method of preparing a low friction bearing having an inner bearing member, a housing and a low friction surface element therebetween, wherein the housing having an inner surface is constructed to surround the bearing member and said housing is comprised of a plurality of sections which cooperatively define the shape of the outer surface of the inner bearing element, the improvement comprising the steps:
   1. winding onto a mandrel a continuous strand of a bondable low friction thread comprised of low friction filaments and bondable filaments impregnated with a bondable resin which is in a solidified yet thermoplastic state;
   2. affixing the wound thread to the inner surface of at least one housing section;
   3. curing the resin to coalesce the threads and integrate the turns of the threads to produce a low friction element; and
   4. then assembling the bearing by constructing the housing sections about the inner bearing element, at least one of the housing sections having the cured low friction element on the inner surface thereof.

2. The method of claim 1 wherein a pair of housing sections with the low friction element bonded thereto is employed as the housing structure.

3. The method of claim 2 wherein the pair of housing sections are assembled together by electron beam welding.

4. The method of claim 1 wherein steps (2) and (3) are performed simultaneously by molding the wound thread into the housing section by the application of heat and pressure.

5. The method of claim 1 wherein the bonding resin is a thermosetting resin.

6. The method of claim 1 wherein the bonding resin is a thermoplastic resin.

7. The method of claim 1 wherein the low friction filaments are comprised of polytetrafluoroethylene.

8. The method of claim 1 wherein the bondable filaments are selected from the group consisting of a polyester, nylon, cotton and an acrylic.

9. The method of claim 1 wherein the mandrel has a surface similar to the exterior shape of the inner bearing element.

10. A low friction bearing comprised of an inner bearing member, a low friction element and a housing surrounding the inner bearing element comprising:
    a low friction element formed from a plurality of turns of a continuous strand of a bondable low friction thread comprised of low friction filaments and bondable filaments impregnated with a resin in a solidified yet thermoplastic state; and
    a plurality of housing sections, at least one of which has its inner surface thereof lined with the wound thread in a cured state wherein the turns are integrated to form a continuous solidified matrix.

11. The bearing of claim 10 wherein the housing is comprised of a pair of housing sections, each lined with the low friction element.

12. The product produced by the method of claim 1.

* * * * *